April 14, 1964    F. FRISCHEN    3,129,051
METHOD OF AND APPARATUS FOR THE DIRECT
RECORDING OF LIGHT RADIATION
Filed July 6, 1956    3 Sheets-Sheet 1
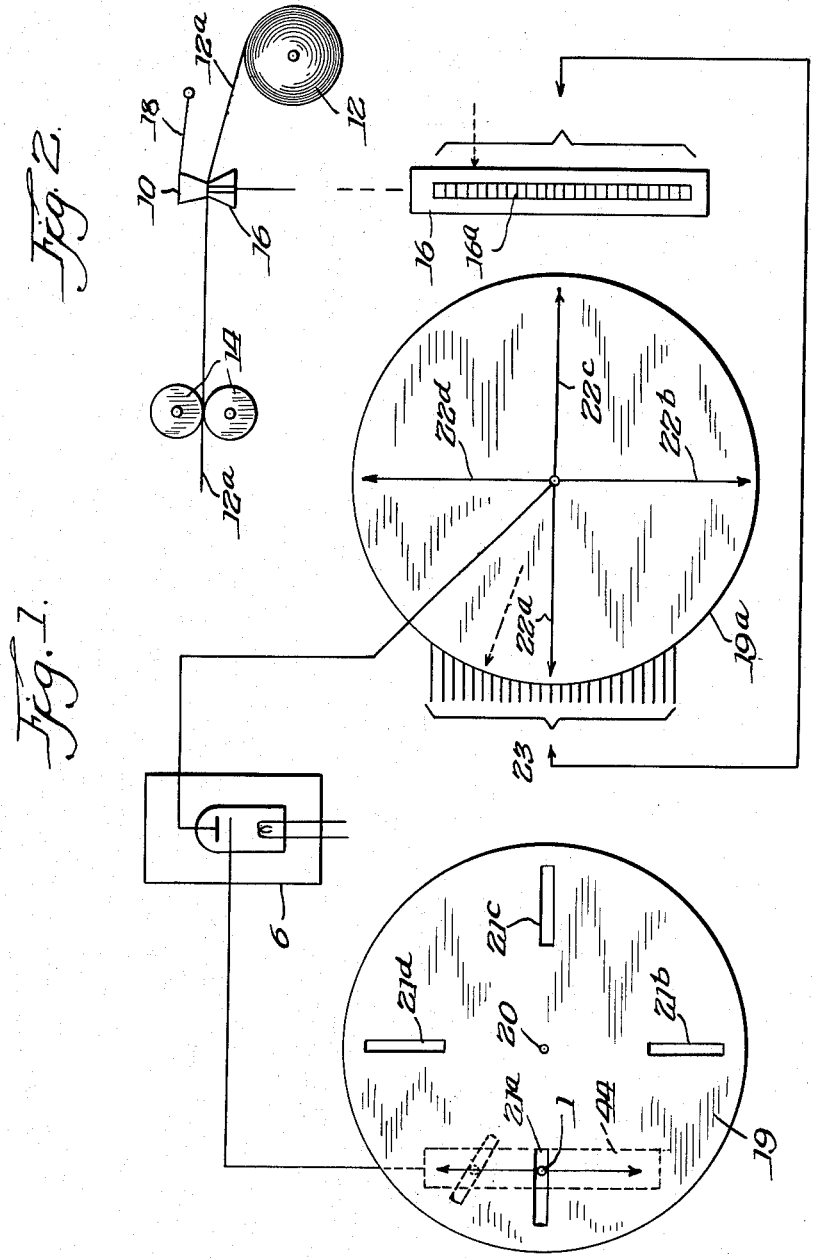
Inventor.
Franz Frischen.
By /Hee /Hee
Attys.

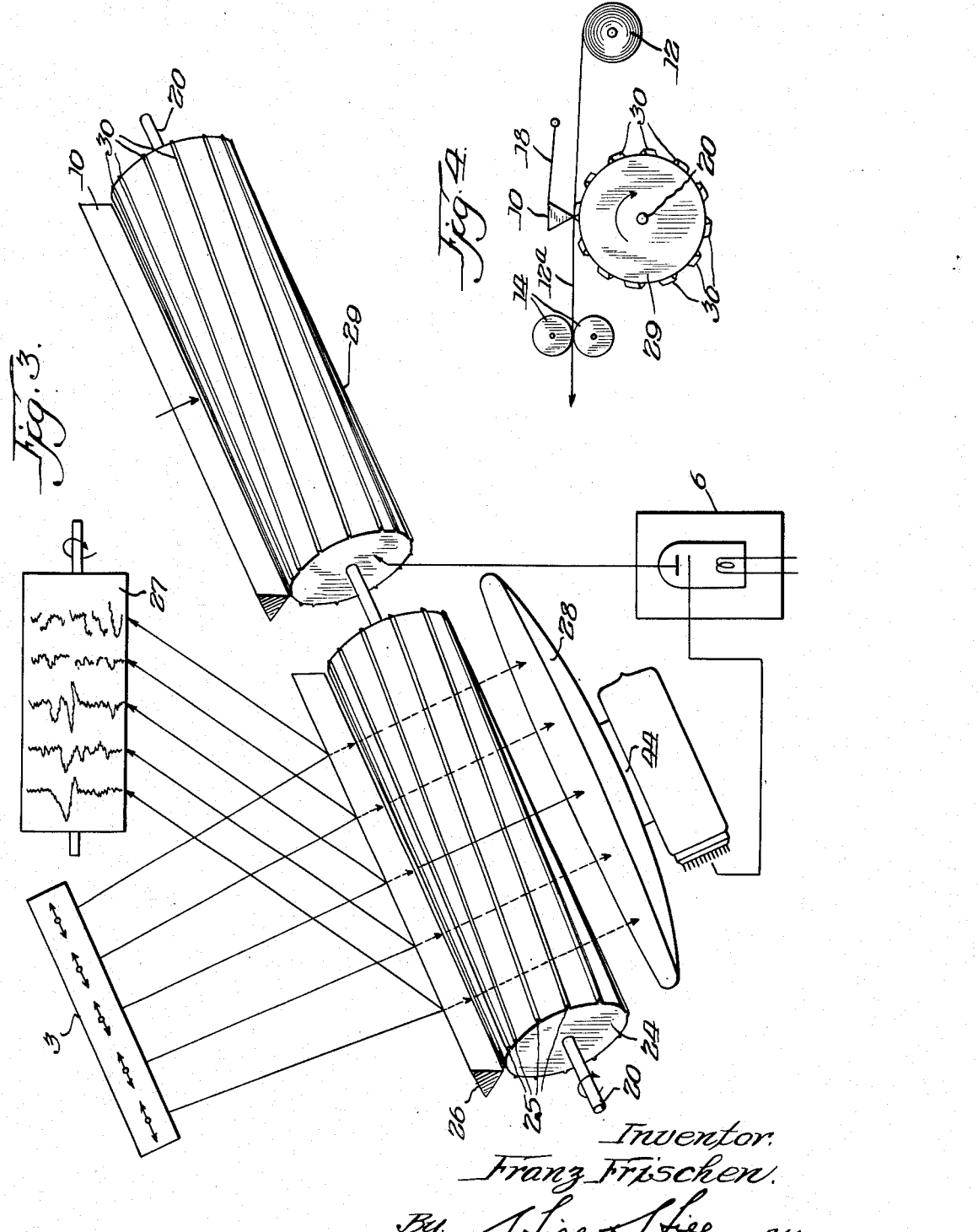

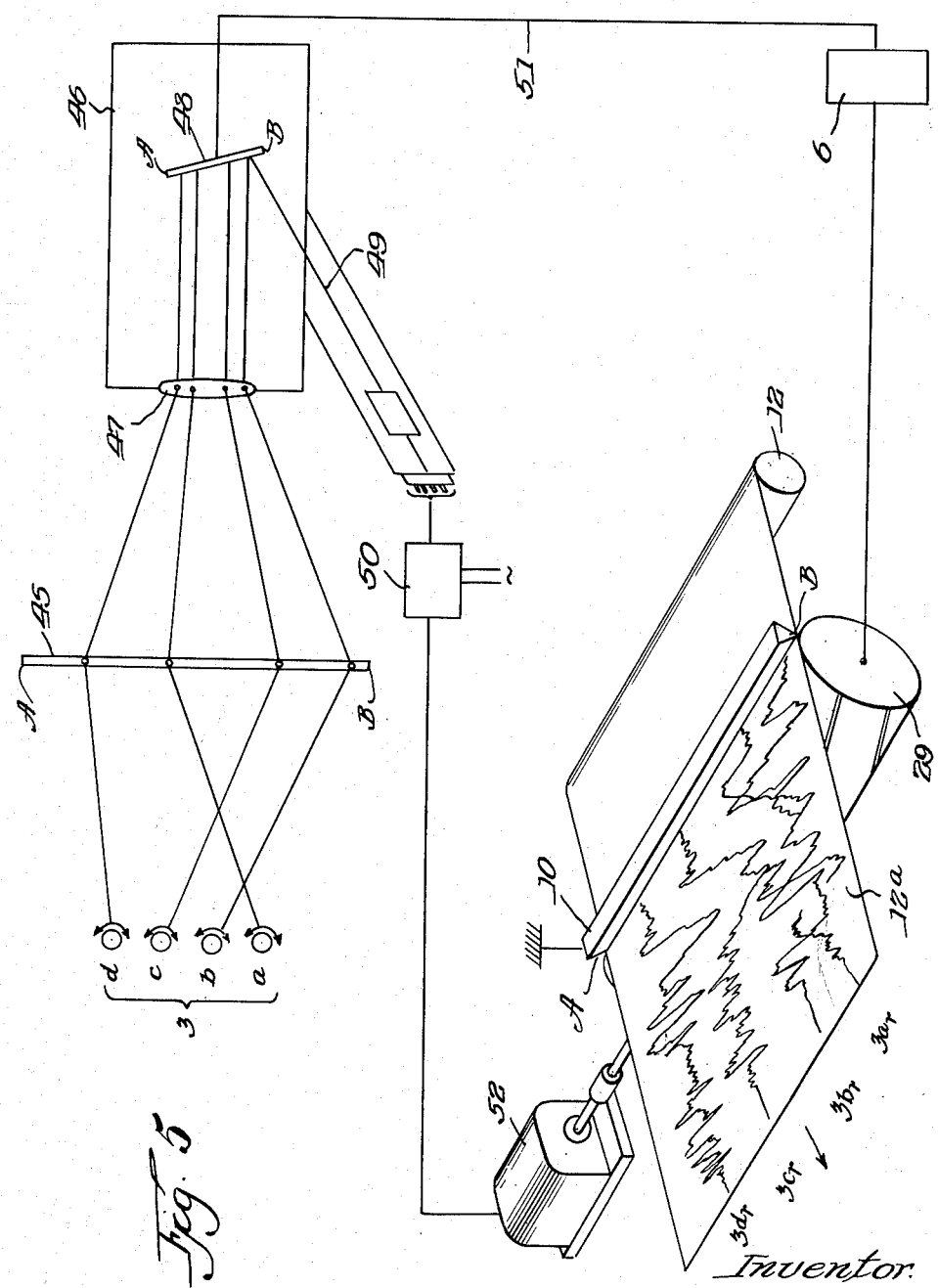

United States Patent Office 3,129,051
Patented Apr. 14, 1964

3,129,051
METHOD OF AND APPARATUS FOR THE DIRECT RECORDING OF LIGHT RADIATION
Franz Frischen, Davenstedter Platz 4, Hannover-Davenstedt, Germany
Filed July 6, 1956, Ser. No. 596,348
Claims priority, application Germany July 8, 1955
4 Claims. (Cl. 346—1)

The invention relates generally to a novel method and apparatus for the direct recording of phenomena which normally is difficult, if capable, of direct recording as a result of the nature of characteristics of such phenomena. The invention is of particular value in connection with the recording of oscillatory processes, such as the output or operation of oscillographs or other similar apparatus, as for example, a light beam produced by a cathode ray tube, reflecting galvanometer, or the like.

Oscillographs have been used in the past, usually to render oscillatory processes visible and record them. recorders of the general type here involved may be broken down into two broad classes, one comprising the so-called luminous spot of photographic recorders, wherein recording is usually effected by a photographic-chemical process; and two, direct recorders which involve direct recording processes by means of suitable mechanical transmission systems without the tedious dark room development required in photographic processes. While photographic type recorders may be satisfactorily operated on comparatively high frequencies, the frequency characteristics of direct recorders has been greatly limited by inherent frequency limitations in the mechanical transmission systems.

The present invention therefore has among its objects the provision of a novel method and apparatus for the direct recording of phenomena such as light radiation, at considerably higher frequencies than heretofore capable with direct recording methods, at the same time eliminating the objections and limitations inherent in a photographic process.

Another object of the invention is the production of a direct recording apparatus, which will provide a record in permanent form, which is at least substantially equivalent to a photographic type of record, and which is relatively free from inertia losses common to previous mechanical transmission systems to provide a relatively wide effective frequency response.

The present invention contemplates the breaking up or sampling of a luminous spot, or similar phenomena, such as the beam of one or more cathode ray tubes, loop oscillographs, reflecting galvanometers and the like, into individual sequential pulses which may be subsequently converted into corresponding electrical pulses by suitable means, as for example, a secondary-electron multiplier tube, hereinafter referred to as a multiplier. The electrical pulses may then be amplified or otherwise acted upon as desired, and subsequently utilized to control or actuate recording mechanism in conjunction with a suitable recording media, examples of which will be hereinafter illustrated.

In the drawings, wherein like reference characters indicate like or corresponding parts:

FIG. 1 is a semi-diagrammatic view of a mechanism for carrying out the present invention;

FIG. 2 is a diagrammatic view of a recording media such as a roll of paper or the like in conjunction with the recording head or element of the mechanism illustrated in FIG. 1;

FIG. 3 is a semi-diagrammatic view of a recording system embodying the present invention, utilizing a modified form of mechanism to that illustrated in FIG. 1;

FIG. 4 is a semi-diagrammatic figure similar to FIG. 2, illustrating details of construction of the apparatus illustrated in FIG. 3; and FIG. 5 is a semi-diagrammatic figure of a modified form of the invention utilizing a light dissecting tube.

Referring to FIGS. 1 and 2, the reference numeral 1 indicates generally a light spot or beam which may emanate from a suitable source, as for example, a cathode ray tube or a loop oscillograph, which in the drawing would be positioned to enter the window 44 of a suitable secondary electron multiplier, the spot or beam having, for example, the path indicated by the arrows in FIG. 1. Interposed in the path of the beam or ray 1 is a slotted disc 19 rotatable about an axis 20, the disc being provided with one or more slots 21a, 21b, 21c, and 21d. As illustrated in FIG. 1, the slots 21 are so positioned on the disc 19 that they will traverse the window 44 as the disc 19 rotates, and if the disc 19 is rotated at a high speed the light rays will be broken up into numerous light pulses.

As the slotted disk 19 is rotated the luminous spot or beam 1 is permitted to pass therethrough to the window 44 of the multiplier whenever a slot 21 of the disk 19 intersects the light rays. This takes place in each case at the point where the luminous spot 1 is positioned at that time. The more rapidly the luminous spot 1 moves back and forth, the higher the speed with which the slotted disk 19 must rotate in order that the points of intersection of the rotating slot or slots 21 with the traveling light ray of the luminous spot 1 and thus the pulses themselves so follow each other in point of time that the pulses, when subsequently combined, will effectively define the action of the light beam or spot.

In order to convert the pulses back again into a recorded form, a second disk which for convenience may be termed a contact disk 19a may be operated synchronously with the slotted disk 19, the disk 19a being provided with suitable contact arms 22a, 22b, 22c, 22d which move over an arcuate contact bank 23 corresponding to the maximum path of the luminous spot 1, the contact arms corresponding to the slots 21a, 21b, 21c and 21d, and being correspondingly positioned.

In the example shown in FIG. 1, the luminous spot 1 is in the center of the window 44 of the multiplier and is aligned with the slot 21a of the disk 19. The resulting pulse produced thereby is received and amplified by the multiplier and conducted to the grid of the input tube of an amplifier means 6. In like manner light impulses will be sequentially transmitted to the multiplier each time a slot is aligned with the beam, and the multiplier, by means of its electrical pulses, controls the amplifier means 6 and the pulses which have now been again amplified are imparted to the contact arms 22a, 22b, 22c, 22d rotating in synchronism with the slotted disk 19, contact arm 22a of said contact arms being in the center of the contact bank 23 corresponding to the position of the slot 21a. In other words, the incident light pulse is represented on the other side at the same place by a current pulse and transmitted via the individual contacts of the contact bank 23 with a suitable recording and registering device. This, for example, may have a bank of keying relays which by means of strikers produce colored spots on a paper tape. Likewise, there may also be provided on a writing edge over which the paper runs a spark chamber in which sparks are produced, controlled by the contact bank 23 by means of individually insulated spark chambers whereby the sparks puncture a layer of paper applied for instance on carbon paper, and thus produce visible recordings.

Preferably, however, as shown in FIGS. 1 and 2, there is employed an electric current bridge 16, the individual electrodes 16a of which may be connected with the individual contacts of the contact bank 23.

Thus the current pulse arrives at one electrode of the current bridge 16, for instance at the center, and on its path to the writing edge 10 flows through the paper 12a guided from the roll 12 over the writing edge 16 by the rollers 14, this paper being so prepared that it becomes colored when current passes through it. In this way a representative image of the light spot 1 is produced at such moment at the particular point on the paper. If the light spot 1 is at a different position along its path (see dotted line in FIG. 1), it will be intersected at this point by one of the slots 21 of the rotating slot disk 19 and the pulse produced at this moment will pass via the above described arrangement once again to the place of the current bridge 16 (see dotted line contact arm and connection to the current bridge 16), which corresponds to the position of the light spot 1 in front of the window 44 of the multiplier. In other words, the light spot 1 is continuously dissected and an image of it produced at the place in the recording device which corresponds to its position in front of the window 44 of the multiplier. The dotted line showing of the light spot 1 will be brought closer and closer to a continuous line as the ratio of the speed of the disks 19 and 23 to the spot speed is increased.

In order to produce a continuous recording of the light spot 1 in the direct recording process, a light dispersing cylinder 24, hereinafter called a light cylinder 24, can be used, as shown in FIG. 3, in place of a rotating slotted disk 19.

This light cylinder 24 may be provided, for example, with individual reflecting edges 25 extending obliquely to the axis 20, the edges intersecting a light prism wedge 26 or the like, arranged parallel to the axis 20 in each case at a point, which corresponds to the position of the light cylinder 24 with respect to the light prism wedge 26.

The example of FIG. 3 illustrates how several spots 3 may be projected onto one of the reflecting edges 25 via the light prism wedge or the like 26. In this connection the center light spot intersects precisely at the upper reflecting edge 25 of the light cylinder 24. The light pulse produced in this connection comes onto the condensing lens 28 of the window 44 of the multiplier. In order to simplify the drawing, the condenser lens 28 has been shown in FIG. 3 opposite the upper reflecting edge 25. Actually, the condensing lens 28 will be so arranged that the light pulses reflected by the reflecting edge strike the condensing lens 28. The pulse produced in this manner is passed forward amplified as already mentioned above with reference to FIG. 1. In this connection a contact means such as indicated in the example with reference to FIG. 1 can be employed. However, there may also be utilized a contact cylinder 29 similar to the light cylinder 24 except that the contact cylinder 29 serves as current conductor, the individual current edges 30 intersecting the writing edge 10 in each case at a point, and the recording on the prepared paper passing between the cylinder 29 and the writing edge 10 being produced in each case at this point by the passage of the current as shown in FIG. 4.

In this arrangement, there is assured a continuous dissecting of the light spot and continuous contact action. In order to assure the production of a continuous line for the corresponding recording on the writing edge 10, the writing edge 10 can be moved or shaken by a very small amount with a suitable vibrating frequency if this should be advisable in connection with a very high frequency characteristic of the light spot or beam 1.

It is self-evident that the light cylinder 24 with its reflecting edges 25 and the contact cylinder 29 with its current edges 30 must run in operational synchronism, and that the light prism wedge 26 and the writing edge 10 must similarly assume corresponding positions in such a manner that the point of intersection of the reflecting edges 25 with the light prism wedge 26 moves exactly in the same manner as the point of intersection of the current edges 30 with the writing edge 10.

Since a point is formed on the recorder (FIG. 3) only whenever a light spot 1 strikes the light cylinder 24 at the intersection of a reflecting edge 25 and the light prism wedge 26, the paths of two or more light spots can also be recorded independently of each other, even if the paths of these light spots cross.

In accordance with the invention the light cylinder 24 can be provided with reflecting edges 25 extending parallel to the axis 20 rather than with obliquely extending reflecting edges 25, provided that the path of the light spot 1 or of the light spots 3 is oblique to the cylinder axis or that the light prism wedge 26 is provided with a corresponding oblique course.

Similarly, the contact cylinder 29 could then be provided with straight current edges extending parallel to the axis 20 and the writing edge 10 could extend oblique to the axis 20 and make the same angle with it as the path of the light spot 1 or light spots 3 or of the light prism wedge 26. In this case the paper also would run over the cylinder at this angle.

In order to render the recording visible independently of the recording or writing system and the course of the paper, a rotating viewing cylinder 27 can be employed in accordance with the invention as illustrated in FIG. 3. This furthermore has the great advantage that the amplitudes, etc., of the single or different light spots can be adjusted prior to the recording proper. The surface of the viewing cylinder may be provided with a luminescent substance which will light up as soon as it is struck by a ray of light and then fade away after a short time so that a continuous recording is possible. Instead of the rotating viewing cylinder 27 there may conversely also be employed a stationary viewing window which is coated with a luminescent substance in the manner set forth above. In this connection the light spot 1 or the light spots 3 are guided by a light ray deflecting device, for instance a rotating reflecting drum, along the window so that the line trace is produced similar to the process in a cathode ray tube.

The illumination both of the viewing cylinder 27 or the viewing window and of the multiplier may be effected by the same light spots 3.

In accordance with the invention, time recording is also possible in a simple way. In this connection unprinted prepared paper can be used. The time recording or cross lining may be effected coupled with the drive motor for the paper feed. For instance, every one-tenth of a second there may be imparted a current pulse which leaves a transverse line on the paper by means of two knife edges arranged above each other and transverse to the direction of travel of the paper. If it is desired in addition also to have a longitudinal lining, correspondingly shaped, superimposed edges can be provided at suitable distances apart in the direction longitudinal to the transport of the paper. Thus as the paper passes between these edges, longitudinal lines will be produced as long as current is flowing between the edges. Small rollers or similar suitable electrodes can also be used to produce the longitudinal lining.

In some cases it may be desirable to utilize an electrically conductive recording paper provided with a thin fiber or coating of metal of high electrical resistance operable to immediately melt upon the passage of current, forming a dot on the surface of the paper, rendering the background clearly visible, especially if it is a color contrasting that of the metal.

Naturally there are also other additional possibilities of a combination of an electro-mechanical nature or even of a completely electronic nature, in order on the one hand to convert rays of light into light pulses and the latter into electric pulses, and on the other hand to produce a regular emission of these electrical pulses for recording purposes. Thus there may be employed an image pick-up tube or the like, in combination with a current bridge 16, a switch tube being provided for each additional electrode 16a of the current bridge 16, unless a special tube were manufactured for this purpose.

There is also possible a combination between a purely electronic pick-up tube (image dissector tube) on the one hand, and an electro-mechanical pulse recording on the other hand, in which connection it may be advisable that the electro-mechanical pulse recording part control the scanning velocity of the pick-up tube as an electro-mechanical scanning is usable to attain the speed of an electronic scanning. In such case an alternating current generator or the like, the frequency of which controls the scanning speed of the scanning tube, can rotate together with the contact cylinder 29. In this way there is positively obtained on the one hand synchronous dissecting and on the other hand recording.

Thus, for example, referring to FIG. 5, the light beams or rays from the instruments 3 may be directed to a stationary viewing window 45, corresponding generally to the viewing cylinder 27 and more particularly to a stationary viewing window as heretofore described, such window being provided with a suitable coating, as for example, a luminescent substance as heretofore described. The images of the light beams appearing on the window 45 and moving in the longitudinal direction A—B, may be focused by a lens 47 on the mosaic screen 48 of an image dissector tube or the like 46, following which the screen may be scanned in the same direction by the beam 49 of the tube and directly converted into current impulses which may be conducted by way of the output 51, if desired, through an amplifier 6 to the writing contact drum 29 similar to that illustrated in FIGS. 3 and 4.

It will be appreciated that in this arrangement the scanning beam 49 must be synchronized with the drum 29 so that the relation of a current edge 30 of the drum 29 with the writing edge 10 corresponds to the simultaneous position of the beam 49 along the mosaic 48. Thus, a suitable device 52, as for example, an alternating current generator or the like, rotatable with the drum 29, may be operatively connected with the sweep generator 50 for the scanning means 49, to control the generator and thus synchronize the reciprocation of the scanning beam to correspond to the movement of corresponding current edges 30 with the writing edge 10.

Thus, the light impulses are converted into electric impulses with a continuous uninterrupted stringing together of the electric impulses to the recording medium, and as clearly illustrated in FIG. 5, the various beams may cross or overlap without creating any interference or confusion therebetween.

Since, as has already been mentioned above, two or more light spots can also be recorded independently of each other, it is advantageous to intersect a plurality of light spots which for instance differ also in their brightness so that in this way there are again obtained pulses, the current intensity of which are different so that there is produced on the prepared paper 12 traversed by the current a corresponding coloring in different degrees of brightness which may correspond to a picture scanned by the principle of the picture dissector.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A method of directly recording the actions of a plurality of beams of light as a function of time, on a recording media, comprising the steps of consecutively dissecting the light beams on a recurring basis solely as a function of time, continuously over the entire range of action of the light beams, whereby the time increments representing the beams actions are continuously variable to operatively cover the entire beam action ranges without gaps, converting said light impulses into electrical impulses without destruction of the continuous nature of such time increments, and recording said electrical impulses continuously throughout the range of said beam actions whereby such impulses representing each light beam are consecutively combined to form substantially closed line courses which are continuous in the direction corresponding to the beam action and intermittent only as may be reflected by the time function of original dissection.

2. In a mechanism for direct recording of the action of a beam of light, the combination of a rotatable light drum having a plurality of similarly disposed mirror edges extending in the same general direction as the drum axis, said drum being operatively positioned in the light beam path for dissecting the light beam into a plurality of light impulses on each revolution of said drum, the beam of light being movable in a direction obliquely disposed with respect to such mirror edges, said drum being rotatable whereby each mirror edge traverses the range of movement of the light beam, means operatively associated with said last mentioned means operative to convert the light impulses into electrical impulses, means for actuating said drum at a uniform rate whereby the time intervals between successive impulses are a function solely of the beam action, a recording media, a rotatable contact drum and a writing edge operatively associated with said recording media, said contact drum having current edges extending obliquely with respect to the writing edge, said contact drum being rotatable in synchronism with said light drum for converting the time intervals between such impulses into relative positions continuously along said media corresponding to the original positions of the beam at the times of dissection.

3. A mechanism as defined in claim 2, wherein the oblique angles between said mirror edges and the direction of movement of the light source, are equal to the oblique angles between said current and writing edges.

4. A mechanism as defined in claim 3, wherein the direction of movement of the light beam and said writing edge are substantially parallel to the axes of their respective cooperable drums.

References Cited in the file of this patent

UNITED STATES PATENTS

| | | |
|---|---|---|
| 912,181 | Schattner | Feb. 9, 1909 |
| 1,934,753 | Wildhaber | Nov. 14, 1933 |
| 2,110,172 | Phinney | Mar. 8, 1938 |
| 2,434,531 | Wilson et al. | Jan. 13, 1948 |
| 2,501,791 | Silverman | Mar. 28, 1950 |
| 2,549,976 | Kraybill | Apr. 24, 1951 |
| 2,600,822 | Yarnall et al. | June 17, 1952 |
| 2,666,807 | Hunt | Jan. 19, 1054 |
| 2,771,336 | MacGriff | Nov. 20, 1956 |